United States Patent [19]

Matsunaga et al.

[11] 4,067,141

[45] Jan. 10, 1978

[54] COATED SEED CONTAINING PULLULAN-BASED RESIN USED AS BINDER

[75] Inventors: Hiroomi Matsunaga, Kobe; Kozo Tsuji; Masashi Watanabe, both of Ibaraki, all of Japan

[73] Assignees: Sumitomo Chemical Company, Limited; Hayashibara Biochemical Laboratories, Incorporated, both of Japan

[21] Appl. No.: 703,264

[22] Filed: July 7, 1976

[30] Foreign Application Priority Data

July 11, 1975 Japan .................................. 50-85561

[51] Int. Cl.$^2$ ................................................ A01C 1/06
[52] U.S. Cl. ............................... 47/57.6; 47/DIG. 9; 71/77; 427/4; 428/403
[58] Field of Search ................... 427/4, 212; 47/57.6, 47/DIG. 9; 71/77; 428/403

[56] References Cited

U.S. PATENT DOCUMENTS

| 2,502,809 | 4/1950 | Vogelsang | 47/57.6 |
| 2,553,577 | 5/1951 | Hale et al. | 47/57.6 |
| 3,808,740 | 5/1974 | Porter et al. | 427/4 |
| 3,936,347 | 2/1976 | Nomura | 162/146 |

FOREIGN PATENT DOCUMENTS

| 678,924 | 1/1964 | Canada | 427/4 |

*Primary Examiner*—Harry J. Gwinnell
*Attorney, Agent, or Firm*—Stevens, Davis, Miller & Mosher

[57] ABSTRACT

When pullulan is used as a binder in coating seeds with inorganic materials, growth hormone preparations, etc., a satisfactory binding effect is obtained with smaller amounts than when conventional binders are used. The resulting inorganic coatings on the seeds are superior in surface hardness and disintegration characteristics in the soil after sowing. Germination of the seed and subsequent growth are not affected by pullulan. Chemically modified pullulan can also be used.

5 Claims, No Drawings

COATED SEED CONTAINING PULLULAN-BASED RESIN USED AS BINDER

The present invention relates to a novel binder for seed-coating and to a method for manufacturing seeds coated with the binder.

At the present time, it is common practice for small seeds to be coated with various materials (e.g., diatomaceous earth, calcium carbonate, talc, etc.,) to facilitate their being sown by machine. When coating seeds with these materials, it is conventional to use starch, gelatin, polyvinyl alcohol, and the like as binders.

However, when the above named conventional binders are used, a number of problems arise, including disintegration of the coating during automated filling, packaging or seeding due to the inferior binding power of the binders and the low surface hardness of the coating. Further, binders for use in seed-coating should have no adverse effect on the crop and should be easily disintegrated by the moisture in soil. Although, when used as a binder, polyvinyl alcohol, for example, affords to a certain desirable degree the bonding strength and surface hardness required for coated seeds, it does not possess proper disintegration characteristics in water and has an adverse effect on the crop.

In order to overcome these disadvantages, we have intensively studied the problem and found that pullulan, which is a linear high polymer having the following molecular structure:

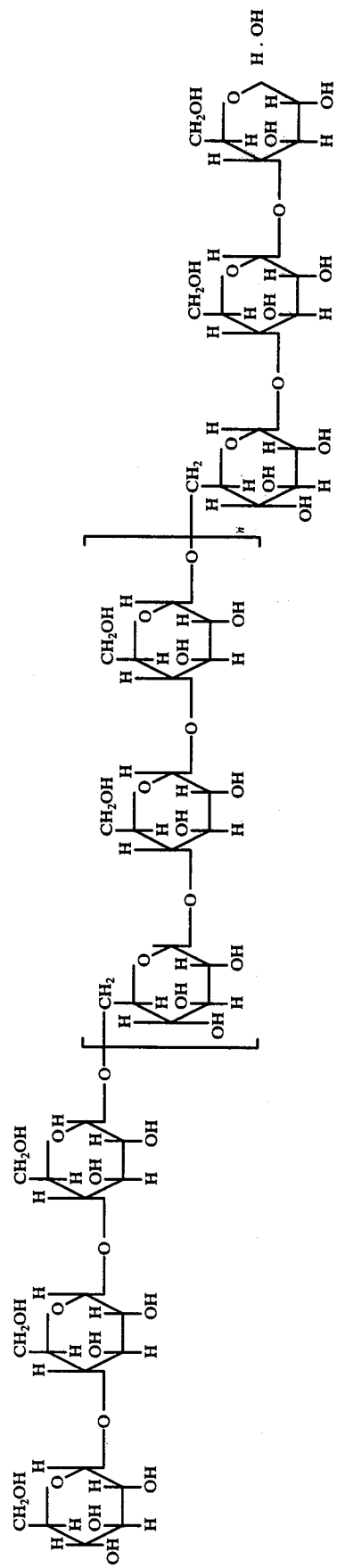

wherein n is an integer indicating the degree of polymerization, and its derivatives can advantageously be used as a binder for coating seeds without causing any harmful effects to their germination, their subsequent growth, and to the crop. Pullulan, when used as a binder provides coated seeds having high surface hardness as well as adequate disintegration characteristics in the soil.

An object of this invention is, therefore, to provide a novel binder for use in coating seeds and an improved seed-coating method.

Another object is to provide improved seed coatings having high surface hardness, as well as adequate disintegration characteristics in soil.

Other objects and merits will become apparent from the following description.

As disclosed in the U.S. Pat. No. 3,936,347, pullulan is prepared by a process of biosythesis, using a strain belonging to the genus pullularia. The physical properties of pullulan vary somewhat, depending on the strain which was used. In accordance with the present invention, however, pullulan obtained from any strain may be used.

The molecular weight of the pullulan used in practicing the present invention is not particularly limited, but an average molecular weight of 10,000 to 1,000,000 is preferred.

Pullulan is easily soluble in cold water. Furthermore, its solubility in water can be modified by a controlled degree of conventional and well-known methods of chemical modification, such as etherification, esterification, phosphorylation, oxidation, or graft polymerization with a vinyl compound. The modified pullulans can also be used as a binder in practicing the present invention, as long as they are soluble in water. A preferred example of such modified pullulan is an acetylated pullulan wherein less than about 1.3/3 of the hydroxy groups in its molecule are substituted with acetyl groups.

In preparing the coated seeds, other binders, such as starch, may be used with the pullulan or the modified pullulan.

The seed coating method of this invention can be carried out by using conventional coating procedures, as for example, by spraying an aqueous solution of pullulan or a modified pullulan onto seeds while the latter are being tumbled with the inorganic substances to be coated on the seeds, or by spraying a mixture of an aqueous solution of pullulan or a modified pullulan and the inorganic substance onto tumbling seeds.

The inorganic substances used in this invention are those customarily used for coating seeds, such as, for example, diatomaceous earth, aluminum hydroxide, calcium hydroxide, magnesium hydroxide, barium hydroxide, calcium sulfate, calcium sulfite, calcium carbonate, silica, calcium silicate, basic magnesium carbonate, kaolin clay, and talc. These substances are applied either singly or in combinations of two or more. The average particle diameter of the inorganic substances is desirably 10 $\mu$ or less; more desirably, 1 $\mu$ or less.

In order to fully manifest the characteristic features of this invention, 0.1 to 50 parts by weight of pullulan or the modified pullulan can be used per 100 parts by weight of the inorganic substances. However, when the amount of pullulan or of the modified pullulan exceeds 15 parts by weight, the increase in cost outweighs the improvement in surface hardness of the coating, while if the amount is less than 0.1 part by weight, the surface hardness decreases to such an extent that the coating has no practical merit. It is, therefore, desirable to use 1 to 15 parts by weight of pullulan or of the modified pullulan per 100 parts by weight of the inorganic substances.

In preparing the aqueous solution of pullulan or of the modified pullulan, a preferred practical concentration is 5 – 15% by weight. However, the seed-coating method of the present invention can be carried out at any concentration at which the aqueous solution of pullulan or of the modified pullulan is sprayable.

The amount of the inorganic substances adhered to a seed varies according to the size of the seed, the purpose of coating, needs, etc.

However, in accordance with the process of the present invention, seeds are usually coated with an amount of inorganic material that increases their size to no more than three times, or even less, their initial diameters.

The equipment for coating seeds, using pullulan or modified pullulan as a binder in accordance with the present invention is that which is customarily used in sugar coating and in fluidized bed coating.

The advantageous features of the coated seeds obtained in accordance with the present invention reside not only in a saving of labor because machine-seeding is made possible, but also in the prolonged shell life of the coated seeds which results from a properly controlled moisture content of the coated seeds as well as from the improved thickness of the coating.

Furthermore, when pullulan or modified pullulan is used as a binder, coated seeds having a high surface hardness can be obtained even when ony small amounts, as compared with conventional binders, are added to the inorganic coating materials. When the resulting coated seeds are sowed, the layer of inorganic substance coated on the seeds is easily disintegrated by the water in the soil and no adverse effects on germination and growth of the seeds is produced as in case of conventional uncoated seeds.

The invention is described in detail below in the Examples which follow. However, it will be apparent to those skilled in the art that the Examples are illustrative only and that the scope of the invention is not limited to the specific materials or procedures exemplified.

EXAMPLE 1

Onto 100 parts by weight of Japanese radish seeds being tumbled in a sugar coating pan, there was sprayed 10 parts of a 5% (by weight) aqueous solution of pullulan (molecular weight, 30,000). 300 parts of diatomaceous earth, having an average particle diameter of 0.5 $\mu$, was then added, in several portions, to coat the seeds. When the seeds has been coated to a particle diameter of about three times the initial diameter, the tumbling motion was interrupted and the coated seeds were discharged from the coating pan. They were then dried in a hot air drier at 40° C. for 20 hours to obtain the finished coated seeds. The results of evaluation of the product were as shown in Table 1.

EXAMPLE 2

Seeds of Japanese radish were coated in the same manner as in Example 1, except that acetylated pullulan (molecular weight, 10,000; substitution degree of hydroxyl group, 1.313) was used in place of the pullulan. The results of evaluation were as shown in Table 1.

COMPARATIVE EXAMPLE 1

Seeds of Japanese radish were coated in the same manner as in Example 1, except that a 8% (by weight) aqueous solution of polyvinyl alcohol (mean polymerization degree, 300 – 700; saponification degree, 88%) was used in place of the pullulan solution. The results of evaluation were as shown in Table 1.

Table 1

| Example No. | Binder | Inorganic substance | Surface* hardness of coated seed | Disintegration** in water |
|---|---|---|---|---|
| 1 | Pullulan | Diatomaceous earth | Good | Good |
| 2 | Acetylated pullulan | " | Good | Good |
| Comparative Example 1 | Polyvinyl alcohol | " | Fair | Poor |

Note:
*Surface hardness of coated seed was evaluated by the resistance to rupture on application of stress with the tip of a fingernail. A coating having sufficient resistance was rated as "good".
**Disintegration in water was evaluated by visual inspection of the ability of the coating to disintegrate in water. A coating which disintegrated easily in water was rated as "good".

Germination of the coated seeds of Japanese radish obtained according to this invention was satisfactory, the germination rate having been comparable to that of uncoated seeds. No difference was observed also in growth of seedlings between the coated and uncoated seeds.

What is claimed is:

1. A coated seed comprising a seed and a coating thereon of an inorganic substance customarily used in coating seeds so they may be sown by machine, said inorganic substance being bonded by 0.1 to 50%, based on the total weight of said inorganic substance, of pullulan, etherified pullulan, esterified pullulan, phosphorylated pullulan, oxidized pullulan or pullulan graft-polymerized with a vinyl compound, to said seed to form a coating thereon having sufficient hardness for machine-seeding and adequate disintegration characteristics in soil.

2. A coated seed comprising a seed and a coating thereon comprising diatomaceous earth, aluminum hydroxide, calcium hydroxide, magnesium hydroxide, barium hydroxide, calcium sulfate, calcium sulfite, calcium carbonate, silica, calcium silicate, basic magnesium carbonate, kaolin clay, talc, or a mixture thereof, said coating being present on said seed in an amount sufficient to increase the diameter of said seed 3 times its initial dimension and bonded by 0.1 to 50%, based on a total weight of said coating, of pullulan or an acetylated pullulan wherein less than 1.3/3 of hydroxy groups in its molecule are acetylated.

3. A coated seed according to claim 1, wherein the pullulan has a molecular weight of 10,000 to 1,000,000.

4. A coated seed according to claim 1, wherein the inorganic substance is diatomaceous earth, aluminum hydroxide, calcium hydroxide, magnesium hydroxide, barium hydroxide, calcium sulfate, calcium sulfite, calcium carbonate, silica, calcium silicate, basic magnesium carbonate, kaolin clay, talc, or a mixture of two or more of these substances.

5. A coated seed according to claim 1, wherein the inorganic substance has an average particle diameter of 10 $\mu$ or less.

* * * * *